Patented Sept. 9, 1952

2,610,156

UNITED STATES PATENT OFFICE 2,610,156

USE OF NONIONIC SURFACE ACTIVE AGENT IN PREPARATION OF ANIONIC RESIN IN BEAD FORM

Lennart A. Lundberg, Stamford, Conn., assignor to American Cyanamid Company, New York, N. Y., a corporation of Maine No Drawing. Application February 17, 1949, Serial No. 77,069

5 Claims. (Cl. 260—2)

This invention relates to ion exchange resins and more particularly, to the production of anion active resins in the form of spheroidal beads.

In the past, liquid polymerizable substances such as styrene, acrylic acid esters and the like have been polymerized in aqueous suspension to produce thermoplastic resins as granular products uniform in composition and particle size. Similarly, spheroidal particles of gels have been prepared by gelation of hydrosols in water-immiscible media. Resins of the thermosetting condensation type such as urea-formaldehyde, melamine-formaldehyde and the like, and particularly resins of the thermosetting condensation type in a cured state such as the ion exchange resins, both anionic and cationic, have however not previously been produced in the form of spheroidal particles or beads of uniform size.

It is an object of the present invention to produce an anion exchange resin active for the removal of anions from, or the exchange of anions in, fluid media in a form which can be used directly, without grinding or screening, in ion exchange processes.

It is another object of the present invention to produce an anion exchange resin in the form of spheroidal particles.

A further object of the present invention is to provide a method for preparing a condensation type, thermosetting, synthetic resin in the form of spheroidal beads.

Still another object of the present invention is to convert a partially condensed, water-soluble resin to a cured, water-insoluble anion active resin in bead form.

It is still a further object of the present invention to prepare in bead form an anion exchange resin which is a condensation product of epichlorohydrin or glycerol dichlorohydrin with a polyalkylene polyamine.

Another object of the present invention is the preparation, in bead form, of an anion exchange resin which is a condensation product of guanidine, melamine, and formaldehyde.

The above and other objects are attained by dispersing an aqueous syrup of a resinous partial condensation product of ingredients which, when fully condensed, produce an insoluble anion active resin in an inert, organic non-solvent medium by mechanical agitation and in the presence of a non-ionic surface active agent, and converting the partially condensed product of the dispersed globules thereby formed to an insoluble resin by heating.

The invention will be described in greater detail in conjunction with the following specific examples in which proportions are given in parts by weight. It should be understood that the examples are merely illustrative and it is not intended that the scope of the invention be limited to the details therein set forth.

EXAMPLE 1

(1) 175 parts of resin "A" syrup
(2) 489 parts of o-dichlorobenzene
(3) 4.9 parts (1.0% of the weight of o-dichlorobenzene) of the reaction product of ethanol stearamide and 8 mols of ethylene oxide, said reaction product having the formula:

$CH_3(CH_2)_{16}CONHCH_2CH_2(OC_2H_4)_8OH$ (2) and (3) are charged into a suitable vessel equipped with an anchor type stirrer, a water trap and means for indication of temperature. The mix is heated to 80° C. and the stirrer adjusted to 150 R. P. M. whereupon (1) is added rapidly. The resulting dispersion is refluxed for one hour at 95° C. and 72 parts of water are removed azeotropically. Refluxing is resumed at 125° C. for 3.5 hours.

Translucent beads are obtained, 41.9% of which are 20–40 mesh.

EXAMPLE 2

(1) 175 parts of resin "B" syrup
(2) 111 parts of toluene, 489 parts of o-dichlorobenzene
(3) 6 parts [1% of the weight of (2)] of the additional product of oleic acid and 8 mols of ethylene oxide ("Emulphor O")

The process of Example 1 is followed. The resin beads obtained have the following set screen analysis: 1.0% on 14 mesh, 23.5% 14–20 mesh, 69.5% 20–40 mesh, 6.0% 40–60 mesh.

EXAMPLE 3

(1) 150 parts of resin "C" syrup
(2) 635 parts of ethylene dichloride
(3) 1.9 parts 0.3% of the weight of (2) of the addition product of ethanol stearamide and 8 mols of ethylene oxide having the formula:
$CH_3(CH_2)_{16}CONHCH_2CH_2(OC_2H_4)_8OH$ (2) and (3) are charged into a suitable vessel equipped with an anchor type stirrer, a water trap, and means for indicating temperature. The mix is heated to reflux, the stirrer is adjusted to 200–210 R. P. M. and (1) is added rapidly. The resulting dispersion is refluxed for one hour after which the bead product formed is filtered off and cured in an oven at 100° C.

EXAMPLE 4

(1) 150 parts of resin "C" syrup
(2) 635 parts of ethylene dichloride
(3) 1.9 parts [0.3% of the weight of (2)] of the addition product of oleic acid and 8 mols of ethylene oxide ("Emulphor O")

The procedure of Example 3 is followed, and cured resin beads suitable for use in anion exchange processes are obtained.

Preparation of resin "A" syrup (1) 189 parts of tetraethylene pentamine (1.0 mol)
(2) 277 parts of epichlorohydrin (3.0 mols)
(2) 466 parts of water (2) is added slowly to (1) and (3) with cooling to maintain the temperature at 45°–55° C. About a half hour is required for the addition. The syrup is then maintained at 50° for 0.75–1.5 hours.

Preparation of resin "B" syrup

The same procedure is followed as for the preparation of resin "A" syrup except that only 366 parts of water are used.

Preparation of resin "C" syrup (1) 126 parts of melamine
(2) 406 parts of 37% aqueous formaldehyde
(3) 21 parts of 50% triethanolamine
(4) 183 parts of guanidine nitrate
(5) 44.2 parts of sulfuric acid
(6) 38.1 parts of water (1) is placed in a suitable vessel equipped with means of agitating and means for indicating temperature and (2) and (3) are added thereto. The resulting slurry is heated with steam until solution occurs, at which point (4) is added and the temperature drops to about 65° C. where it is maintained for 10 minutes. The clear water white syrup is cooled immediately to 25° C. and (5) and (6) are slowly added while the temperature is maintained at 27°–33° C. The syrup has a viscosity of 3.0 poises.

Anion active, synthetic resins to which the process of the present invention is applicable include those described in U. S. Patents Nos. 2,285,750, 2,395,825, 2,341,907, 2,402,384 and 2,251,234 as well as those described and claimed in my copending application with James R. Dudley, U. S. application Serial No. 616,644 filed September 15, 1945. Other anion resins to which the process may be applied include condensation products of acetaldehyde, formaldehyde and polyalkylene polyamines (Serial No. 643,836 filed January 26, 1946); of aminotriazine, aldehyde, and guanido compounds (Serial No. 607,277 filed July 26, 1945); of aminotriazine, aldehyde, strongly basic non-aromatic amines (Serial No. 649,127 filed February 20, 1946); of biguanide, carbonyl compounds and aldehydes (Serial No. 703,481 filed October 16, 1946); of crotonaldehyde, formaldehyde, and polyalkylene polyamine (Serial No. 643,838 filed January 26, 1946); of polyepoxy compounds and alkylene polyamines (Serial No. 655,005 filed March 16, 1946); of glycerol dichlorohydrin and alkylene polyamines (Serial No. 624,606 filed October 25, 1945), of furfural, guanido compounds and carbonyl compounds (Serial No. 703,489 filed October 16, 1946); and of furyl aliphatic amines and aldehydes (Serial No. 642,416 filed January 19, 1946).

In general, my process may be applied to any anion active resin of the condensation type which has a sufficiently rapid rate of gelation for bead formation. When the gelation rate is too slow, the resin globules agglomerate before they become hardened by gel formation.

Non-ionic surface active agents which are ethylene oxide addition products generally are useful in the present process. Examples of such products, which are ethylene oxide addition products of acids, amines, amides, alcohols, etc., containing a higher alkyl group (8–18 carbons), include in addition to those of the specific examples, polyethylene glycol-substituted maleic acid esters, the ethylene oxide condensation products of manitan and sorbitan monoesters of higher fatty acids such as palmitic, stearic and oleic acids, the addition products of octadecylamine with ethylene oxide, of stearoguanamine and ethylene oxide, and the like.

The optimum amount of ethylene oxide addition product used will vary, depending upon the rate and type of agitation, the non-solvent medium and particularly its density, the resin dispersant and particularly its viscosity, the desired bead size, etc. The minimum quantity of dispersing agent for any particular system is that amount which will keep the resin dispersed in the non-solvent medium; the maximum quantity is dependent upon the desired bead size since, in general, the larger the quantity of dispersing agent the smaller the bead. In general, I use from about 0.005% to about 3%, based on the weight of non-solvent medium, of surface active agent.

Organic non-solvent media which may be used in the practice of the process of the present invention must be liquid at room temperature, insoluble in water, stable toward heat (up to about 70°–130° C. at least), not readily hydrolyzable and inert, i. e., non-reactive with the initial resin-forming materials or their partial or final condensation products. In addition they should preferably boil above about 70° C. and have specific gravities substantially equivalent to those of the resin syrup, generally from about 1.1 to 1.5. The non-solvent media may each consist of a single compound, or they may be mixtures of two or more compounds as in Example 2 if the properties of the combination fit the necessary qualification.

Following are some non-solvent media which may advantageously be used in the process of the present invention:

| | Boiling Point °C. | Specific Gravity |
|---|---|---|
| propylidene dichloride | 87 | 1.143 |
| trimethylenedichloride | 123–5 | 1.201 |
| propylenechloride | 96.8 | 1.159 |
| 1,3-propylenedichloride | 109 | 1.204 |
| trichlorethylene | 87.2 | 1.466 |
| 1,1,2-trichlorethane | 113.5 | 1.441 |
| 1,1,1-trichlorethane | 74.1 | 1.325 |
| o-dichlorbenzene | 179 | 1.305 |
| ethylene dichloride | 83.7 | 1.256 |
| 1,2,4-trichlorbenzene | 213 | 1.446 |
| 3,3'-dichlorodi-n-propyl ether | 215 | 1.140 |
| sym. dichlorethyl ether | 178.5 | 1.222 |
| 2,2-dichlorethanol-1 | 146 | 1.145 |
| nitrobenzene | 211 | 1.205 |
| o-nitroethylbenzene | 227 | 1.126 |
| o-nitrophenetol | 275 | 1.190 |
| o-nitrotoluene | 223 | 1.163 |
| 1,2-dimethyl-3-nitrobenzene | 240 | 1.147 |
| p-fluorochlorbenzene | 130 | 1.226 |
| fluoronaphthalene | 212 | 1.133 |
| 1-bromohexane | 156 | 1.173 |
| 1-bromoctane | 188 | 1.099 |
| 1-brompropane | 71 | 1.353 |
| diphenyl ether | 235 (60 mm.) | 1.295 |

Non-solvent media of higher than the preferred specific gravity may be diluted with less dense liquids such as toluene and/or xylene until the density of the combination is substantially equivalent to that of the resin syrup and then used satisfactorily in the present process. A few of these media of higher specific gravity are

|  | Boiling Point °C. | Specific Gravity |
|---|---|---|
| sym. tetrachlorethane | 146.3 | 1.600 |
| sym. tetrabromethane | 151 (54 mm.) | 2.964 2.964 |
| 1,1,2-tribromethane | 188 | 2.579 |

Furthermore, non-solvent media of lower than the preferred specific gravity may also be used if other variables of the system in question are modified to counteract the effect of the density differential between the resin and the non-solvent therefor. Such variables include, for example, the efficiency (rate and type) of agitation which should be stepped up and the viscosity of the resin syrup which should, if possible, be heavier. Preferred media of lower specific gravity include:

|  | Boiling Point °C. | Specific Gravity |
|---|---|---|
| toluene | 110.8 | 0.866 |
| o-xylene | 144 | 0.881 |
| m-xylene | 139.3 | 0.867 |
| p-xylene | 138.5 | 0.861 |
| 1,2,3-trimethylbenzene | 176.1 | 0.894 |
| 1,2,4-trimethylbenzene | 169.3 | 0.876 |
| 1,3,5-trimethylbenzene | 164.8 | 0.865 |
| ethyl benzene | 136.2 | 0.867 |
| isopropylbenzene | 152.5 | 0.862 |
| p-cymene | 176–7 | 0.857 |

In the event that an extremely inert non-solvent medium is required, suitable liquids include xylene hexafluoride, xylene hexachloride, toluene trifluoride, those fluorcarbons and fluorochlorocarbons having the necessary boiling point and specific gravity, mixtures of these inert media with each other and with other media mentioned above as suitable.

The mechanical agitation taking place during the process of the present invention is very important. The degree and type of agitation must be sufficient to keep the dispersion from coagulating but it has a variable upper limit depending upon the size of beads desired and the practicality of producing them. With an anchor type stirrer, as used in the examples, a speed of from about 100–200 R. P. M. is generally preferred for the production of resin beads within a range suitable for use in ion exchange processes, i. e., from about 8–60 mesh, wet-screened, on a standard U. S. Sieve Series (U. S. Bureau of Standards, Standard Screen Series, 1919). However, the speed can go as high as about 600 R. P. M. in which case a much smaller bead is formed from a comparable resin syrup. Furthermore, in many cases variable speed agitation is desirable, gel formation being effected at relatively low speed followed by increased speed to prevent agglomeration of the dispersed particles during the cure. Impeller, impeller-baffle, turbine and other type agitating means may be substituted for the anchor type of the examples.

When extremely small or micro beads are desired, as for medicinal ion exchange application, a high agitation rate with relatively large amounts of surface active agent are critical factors. In addition, as the rate of agitation is increased, the viscosity of the resin solution may need to be increased in order for bead formation to take place.

The success of my process appears to depend at least in part on the establishment, under any given set of conditions, of an interfacial tension in the resin-medium system which is within a definite range conducive to the formation of spheroidal particles. My process is specific to the particular type surface active agent claimed, however, since not all surface active agents which produce an interfacial tension within the predetermined range will necessarily work. I have found that the cationic hydroxyalkyl amine salts and the quaternary ammonium salts disclosed in the present application are suitable for use in the preparation of phenol-formaldehyde condensation products containing omega sulfonic acid groups in spheroidal form according to the present process.

It may be desirable, according to the process of the present invention, to remove at least a portion of the water from the dispersed resin syrup in order to increase the reflux temperature of the system, particularly if the resin is to be cured in the non-solvent liquid or if it has a relatively slow rate of gelation.

Once gelation has occurred the resin beads are cured by heating in the presence or absence of a non-solvent liquid at from about 50°–130° C., the preferred curing temperature within the range depending upon the particular resin. For instance I cure beads of epichlorohydrin-polyalkylenepolyamine resin at about 90°–130° C., preferably at about 100°–125° C., beads of guanidine-melamine-formaldehyde resin at about 50–110° C. and preferably in two stages, the first around 50° C. and the second around 100° C.

The process of the present invention may be applied to the preparation of dyes, pigments, catalysts and ionic or non-ionic resinous materials in the form of spheroidal or micro-spheroidal particles which because of their spheroidal nature, possess special advantages over the corresponding granular products.

Similar processes applied to other type resins and/or other type surface active agents are described and claimed in the copending application of Arthur S. Nyquist, Serial No. 77,071, filed February 17, 1949, entitled "Preparation of Non-Nuclearly Sulfonated Phenol-Formaldehyde Resin in Bead Form" and in my copending applications identified below:

| Serial No. | Filing Date | Title |
|---|---|---|
| 77,070 | February 17, 1949 | Preparation of Nuclearly Sulfonated Phenol-Formaldehyde Resin in Bead Form. |
| 77,068 | February 17, 1949 | Use of Cationic Surface Active Agent in Preparation of Anionic Resin in Bead Form. |
| 77,067 | February 17, 1949 | Use of Petroleum Sulfonates in Preparation of Resinous Condensation Products in Bead Form. |

I claim:
1. A process which comprises dispersing an aqueous syrup of a partially condensed resin capable of being cured to a water-insoluble anion active product in an inert, organic non-solvent liquid which has a boiling point of at least 70° C. and the density of which is substantially equivalent to that of said aqueous resin syrup, with mechanical agitation in the presence of a nonionic surface active agent which is an ethylene oxide addition product, maintaining the dispersion at an elevated temperature until the resin gels, and finally curing the gelled resin obtained by heating, sufficient agitation being provided throughout the heating to prevent coagulation of the dispersion.

2. A process in accordance with claim 1 in which the non-solvent liquid is a chlorinated hydrocarbon.

3. A process in accordance with claim 1 in which the anion active product is a condensation product of epichlorohydrin and a polyalkylene polyamine.

4. A process in accordance with claim 1 in which the anion active product is a condensation product of melamine, guanidine and formaldehyde.

5. A process in accordance with claim 1 in which water is azeotropically removed from the dispersed resin during the pre-curing heating.

LENNART A. LUNDBERG.

REFERENCES CITED

The following references are of record in the file of this patent:

UNITED STATES PATENTS

| Number | Name | Date |
| --- | --- | --- |
| 2,469,683 | Dudley et al. | May 10, 1949 |
| 2,518,420 | Evers | Aug. 8, 1950 |

FOREIGN PATENTS

| Number | Country | Date |
| --- | --- | --- |
| 585,538 | Great Britain | Feb. 11, 1947 |